United States Patent
Rabasa

(12) 
(10) Patent No.: US 6,338,769 B1
(45) Date of Patent: Jan. 15, 2002

(54) PROCESS FOR FORMING INTERRUPTED MATERIAL WITH BACKING

(76) Inventor: Jorge Salles Rabasa, C. del Pare Llaurador, 12, Terrassa, 08224 (ES)

( * ) Notice: Subject to any disclaimer, the term of this patent is extended or adjusted under 35 U.S.C. 154(b) by 0 days.

(21) Appl. No.: 09/209,682

(22) Filed: Dec. 11, 1998

(51) Int. Cl.[7] .......................... B32B 31/08; B32B 31/10; B32B 31/20

(52) U.S. Cl. ...................... 156/289; 156/302; 156/552; 156/555; 156/583.5; 425/373

(58) Field of Search ................................ 156/289, 302, 156/307.3, 307.7, 583.5, 537, 555, 552; 425/373

(56) References Cited

U.S. PATENT DOCUMENTS 3,923,583 A * 12/1975 Bianchini ............ 156/583.5 X

* cited by examiner

Primary Examiner—Adrienne C. Johnstone
(74) Attorney, Agent, or Firm—Womble Carlyle Sandridge & Rice, P.L.L.C.

(57) ABSTRACT

A method to obtaining a product formed by a discontinuous/interrupted material and backing, using a continuous gluing/heating machine. A base material is provided with a thermo adhesive resin or an elastomer. A discontinuous/interrupted material is placed over the base material and pressed or joined to form a product comprising the base material and the discontinuous/interrupted material. The combined produce undergoes a predetermined temperature and a predetermined pressure.

12 Claims, 1 Drawing Sheet

PROCESS FOR FORMING INTERRUPTED MATERIAL WITH BACKING

BACKGROUND OF THE INVENTION (1) Field of the Invention

This invention generally relates to the process and apparatus used to form a product by combining a base material with discontinuous or interrupted materials and, more particularly, to the bonding of an elastic base material to an organic material such as leather.

(2) Description of the Prior Art

A procedure already is known for the forming of an article comprising two materials. One material has at least one good side, e.g., hide or other interrupted material, that may be lined with a resin. The second material may be a textile or a synthetic material. The procedure to unite such materials comprises a plate press, which can be warmed by electricity or oil. Pressure may be applied to the plate press by using springs or a pressure or tire system with manual or automatic plate clasps, as is well known in the art. Adhesion occurs between the two materials due to resulting pressure and/or heat.

Automated plate presses are used to make articles of clothing. For example, linings are added to the visible part of an article of clothing in order to give support to the visible part or good side of the fabric or hide.

The shortcomings of known procedures include the inability to use first materials that are not continuous. Using known procedures with discontinuous articles requires individual pressing of each product, thereby losing efficiencies and greatly increasing costs and time incurred for each product.

Use of known pressing machines for two layers of continuous material employ a roller that places pressure against a fixed surface. These types of pressing machines are suitable for the pressing of two layers of continuous material, but if they were to be utilized with an interrupted material, there would be difficulties in the entrance of the contact zone between the roller and the fixed surface, due to the space not being adaptable to the thickness of the interrupted material.

Thus, there remains a need for an automated process that can efficiently join a support or backing to discontinuous materials.

SUMMARY OF THE INVENTION

The present invention refers to a process for the attainment of a product formed by a material and discontinuous/interrupted materials, that entail the following stages: a)

Preparation of the base material with a thermo adhesive resin or an elastomer; b)

Placement of the interrupted base material over the base material; and c) Joining of the product formed by the base material and the interrupted material at a predetermined temperature and pressure.

According to another aspect, the invention refers to the utilization of a continuous gluing press for the realization of the given process.

With the procedure and the utilization of the following invention, one is able to resolve the above inconveniences, and other advantages are presented which will be described.

These and other aspects of the present invention will become apparent to those skilled in the art after a reading of the following description of the preferred embodiment when considered with the drawings.

DESCRIPTION OF THE PREFERRED EMBODIMENTS

Figure 1:
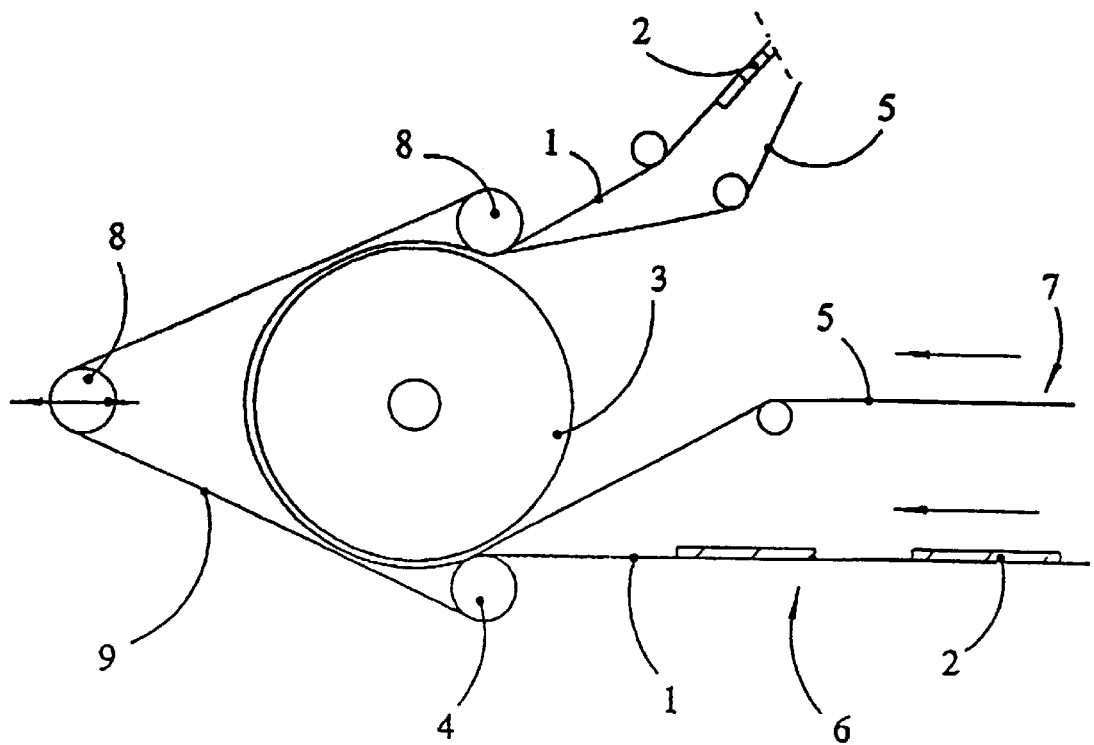
FIG. 1 is a schematic lateral view of the continuous gluing machine according to the present invention.

As shown in FIG. 1, the present invention includes continuous gluing machines that comprises a transportation tape 6 that supplies the base material 1 to adhere in a continuous manner. Also, the machine includes a pair of displaceable rollers 3, 4 that realize the adhesion of the material to join/adhere at a predetermined temperature and pressure depending on the type of material to be joined, fused or vulcanized together.

According to the present invention, the adhesion of the product is initiated in the zone between two displaceable revolving rollers. The adhesion continues between one of the rollers and a belt 9. The belt 9 is associated with both rollers. A given product is fed, in a continuous manner upon a transportation/moving tape 6, to the zone between the two rollers. In accordance with this characteristic, it is possible to realize the attainment of a product formed by a continuous base material with an interrupted material in a continuous manner, what will reflect as a decrease in the cost of the product. In addition, the process allows one to minimize the time in the creation of the product due to the above automation.

Preferably, before the press is placed over the product formed by the base material and the interrupted materials, an appropriate film is retrieved once the adhesion is completed. The placement of this film preferably is the final step to reduce the possibility of the product from sticking to the surfaces where the adhesion takes place.

Preferably, adhesion occurs at a pressure between 100 and 200 kg/cm2 and at a temperature less than 160° C. Preferably the speed of the periphery of the rollers is between 8 and 40 m/h.

Once the base material is joined to the discontinuous material, the product can be taken to subsequent stages to finish the product.

In addition, other processing can occur to the discontinuous material and/or backing before or after joining, as is well known in the art. Such other processes include shine/gloss, ironed, bathed, etc. If the material is still in the crust stage, it can be dyed by piece, by cord, by dyeing apparatus or an empty drum, double circulation or emptied in heat. In addition, it can proceed to be printed by piece, in "lionesa" or cylinder, as is well known in the art. Additional steps of dyeing can occur, such as in accordance with another procedure, as described in the patent ES 9003265 owned by the same assignee of the present invention and as incorporated herein by reference.

Depending on the nature of the base material, the preparation of the same is realized through lamination or "reticulation" of a printed thermo adhesive resin, as is known in the art.

Preferably, the thermo adhesive resin is chosen between polyester, polyvinyl, polyurethane and an acrylic material, and the elastomer is chosen between synthetic rubber and neoprene.

Also, preferably, the base material utilized can be chosen between natural fiber fabric, artificial fiber fabric, synthetic fiber fabric, textured fiber fabric, technical woven fabric, elastic or "ignifugo" and generic stitch fabric or generic woven fabric.

Depending on the desired final product, the interrupted material is chosen between vegetable materials, such as cork, animal materials such as cow skin, lambskin, pigskin, or similarly by the flower or by the meat of the above, and synthetic materials or materials not woven in cut form like, for example, letters or designs of trademarks, logos, coat of arms, etc.

Optionally, parts of the interrupted material can be used as clothing or accessories, rugs, footwear, belts, purses, luggage, etc.

Preferably, the film of the material susceptible to be retrieved after the press is a paper or silicone film.

According to another aspect, the invention includes the utilization of a continuous gluing machine for the realization of the process of the invention.

Advantageously, the gluing machine continues to entail a transportable tape for the location of the film of the susceptible material that is retrieved after the press/joining.

As shown in FIG. 1, the continuous gluing machine takes the transportable tape 6 over the area where the finished product of the base material 1 and the interrupted material 2 is situated. Through the given transportable tape 6, it supplies the product in a continuous manner to the location where the same press/joining is realized.

The continuous gluing machine can also include a second transportable tape 7 that situates a paper or silicone film over the product, in a manner that the cited film 5 can be retrieved once realized through the press. In this manner rubber or similar materials are given greater strength, resistance, or elasticity by combining with sulfur or other additives in the presence of heat and pressure.

The given press/joining is initiated in the zone between two displaceable revolving rollers 3, 4 and continues between one of the rollers 3 and a belt 9 associated to both revolving rollers, that are being fed the given product in the zone between the two rollers 3, 4 in a continuous manner, and being that the radius of one of the given rollers 3 is significantly greater than the radius of the other roller. Because the rollers 3, 4 are revolving and displaceable, they can adequately adapt their position so that the separation between the two is adequate for the realization of the press/junction without problems pertaining to the discontinuity of the material 2.

The press is realized at a pressure comprised between 100 and 200 kg/cm2 and a temperature less than 160° C., being that the velocity in the periphery of the rollers is established between 8 and 40 m/h. The final location of the paper or silicone film 5 preferably is interrupted to make sure that the base fabric 1 is glued over the roller 3.

The continuous gluing machine also entails two additional rollers 8, being that it can displace one of the rollers longitudinally with respect to the transportable tape 6 in order to tighten the belt 9.

The procedure of the invention accomplishes the following stages:

1) In the first place, the preparation of the base fabric is realized 1 with a thermo adhesive resin so to permit the posterior adhesion of the interrupted material 2 to the given base fabric 1. The thermo adhesive resin can by polyester, polyvinyl, polyurethane, or an acrylic material and an elastic rubber or neoprene.

2) Next, the interrupted material 2 is situated over the base fabric 1, as the product is situating itself over a transportable tape 6 which will supply the product in a continuous fashion. The interrupted materials can be whatever, but preferably vegetable materials, such as cork, animal skins, synthetic materials, and unwoven materials, such as letters, coat of arms, or logos.

3) Before initiating the press, a paper or silicone film is situated 5 intervening a transporting tape 7 over the product.

4) Next, the product is pressed together at a predetermined temperature, pressure, and velocity depending on the base fabric 1 and the interrupted materials 2. This press will cause the interrupted materials 2 to adhere to the base fabric 1.

5) Once the product is pressed/adhered together, it is submitted to a final finishing, such as dye, printing, or other adequate finishes.

In this way, it is possible to attain a product formed by the base material and interrupted products in a continuous fashion.

The junction/unification of the product is initiated in the zone between two displaceable revolving rollers (3, 4) and it continues between one of the rollers (3) and a belt (9) associated with both revolving rollers, being fed the given product in the zone between the two rollers (3, 4) in a continuous manner. Also, a prior stage to the joining/gluing stage concerns the positioning (5) of a film so that the susceptible material is capable of being retrieved after the joining/gluing process. This permits the making of a product formed by a discontinuous base material in a continuous manner.

An important application of the present invention pertains to the use of a leather hide as the discontinuous material with an elastic backing. In such a manner, the leather is made stretchable in that it will return to its pre-deformed state due to the use of the elastic backing. Leather typically does not have great elasticity, as herein defined to be the property of returning to an initial form or state following deformation. Hence, as elastic backing is used, giving the combined material good stretchability, which is important when the combined material is formed into apparel, such as pants. Initially sheepskins of thickness' of approximately 0.8 to 0.9 mm were used. Extensive tests have shown that sheepskin, with a thickness of between and about 0.005 to 0.006 mm, yields optimal good performance that was not expected. Such a thickness range results in optimal stretchability. In addition, this thickness results in good adherence between the base material and the leather hides through wearing cycles.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. A method for forming interrupted material with backing comprising:
  (a) laminating a material base with a thermo adhesive resin;
  (b) placing an interrupted material over the base material; and
  (c) pressing the base material and the interrupted material at a predetermined temperature and pressure to form the interrupted material with backing, whereby the pressing is initiated in a zone between two displaceable revolving rollers and continues between one of the rollers and a belt associated to both revolving rollers, the base material and interrupted material being fed between the two rollers in a continuous manner.

2. The method according to claim 1, further comprising the step of locating a film over the base material and interrupted material, before pressing, whereby the film is retrieved once the product is pressed together and joined.

3. The method of claim 2, whereby the film, covering the susceptible material to be retrieved after the pressing, is a paper film or silicone film.

4. The method of claim 1 whereby the pressing occurs at a pressure between about 100 and about 200 kg/cm2.

5. The method of claim 1 whereby the speed of the periphery of the rollers is between about 8 and about 40 m/h.

6. The method of claim 1 whereby the temperature in the area of the pressing is less than about 160° Celsius.

7. The method of claim 1 whereby the product undergoes a final finishing stage.

8. The method of claim 1 whereby the thermo adhesive resin, of which the base material 1 is prepared with, is chosen between polyester, polyvinyl, polyurethane, and an acrylic material, and the elastomer is chosen between rubber and neoprene.

9. The method of claim 1 whereby the base material is chosen between: natural fiber fabric, artificial fiber fabric, synthetic fiber fabric, textured fiber fabric, technical woven fabric, elastic or "ignifugo," and general stitch fabric or general "warped" stitch fabric.

10. The method of claim 1 whereby the interrupted material with backing is apparel.

11. The method of claim 1 whereby the interrupted material is vegetable material, animal material, synthetic material, or material not woven in cut form.

12. The method of claim 11 whereby the interrupted material has a thickness of between and about 0.5 to 0.6 mm.

* * * * *